April 12, 1938.  P. H. DONOVAN  2,113,649
FLUID PRESSURE BRAKE
Filed July 29, 1936  2 Sheets-Sheet 2

INVENTOR
PATRICK H. DONOVAN
BY *Wm. W. Cady*
ATTORNEY

Patented Apr. 12, 1938

2,113,649

UNITED STATES PATENT OFFICE 2,113,649

FLUID PRESSURE BRAKE

Patrick H. Donovan, Chicago, Ill., assignor to The Westinghouse Air Brake Company, Wilmerding, Pa., a corporation of Pennsylvania Application July 29, 1936, Serial No. 93,216

11 Claims. (Cl. 303—9)

This invention relates to fluid pressure brake equipment for railway trains and more particularly to such equipment that is adapted to secure quick serial application of the brakes throughout the train.

In the usual automatic brake equipment brake control valve devices are provided on each car for controlling the application of the brakes and for effecting a local reduction in brake pipe pressure resulting in a quick service wave of reduction in brake pipe pressure along the train, upon a reduction in brake pipe pressure at a service rate at the head end of the train. This operation of the brake controlling valve devices, increases the rate of travel of the wave of brake pipe reduction throughout the train to effect a quick service serial operation of the several brake controlling valve devices to a brake applying position. A substantial reduction in brake pipe pressure at each brake controlling valve device, say three or four pounds, is usually required to effect the operation of the device to a brake applying position. It takes an appreciable time in the case of long trains for a wave of reduction in brake pipe pressure of this amount to travel throughout the length of the train.

An object of my invention is to provide a brake equipment for railway trains in which quick service serial action from the rear end of the train would be effected in advance of the wave of quick service action from the head end of the train, upon the initiation of a reduction in brake pipe pressure at the head end of the train.

Another object of my invention is to provide a brake equipment comprising the usual brake controlling valve devices operative upon a reduction in brake pipe pressure for supplying fluid under pressure to a brake cylinder and a separate emergency valve device also operative upon a sudden reduction in brake pipe pressure for supplying fluid under pressure to an emergency brake cylinder, fluid under pressure being preferably applied to the emergency brake cylinder from the brake pipe by operation of a quick action vent valve device.

Figure 1:
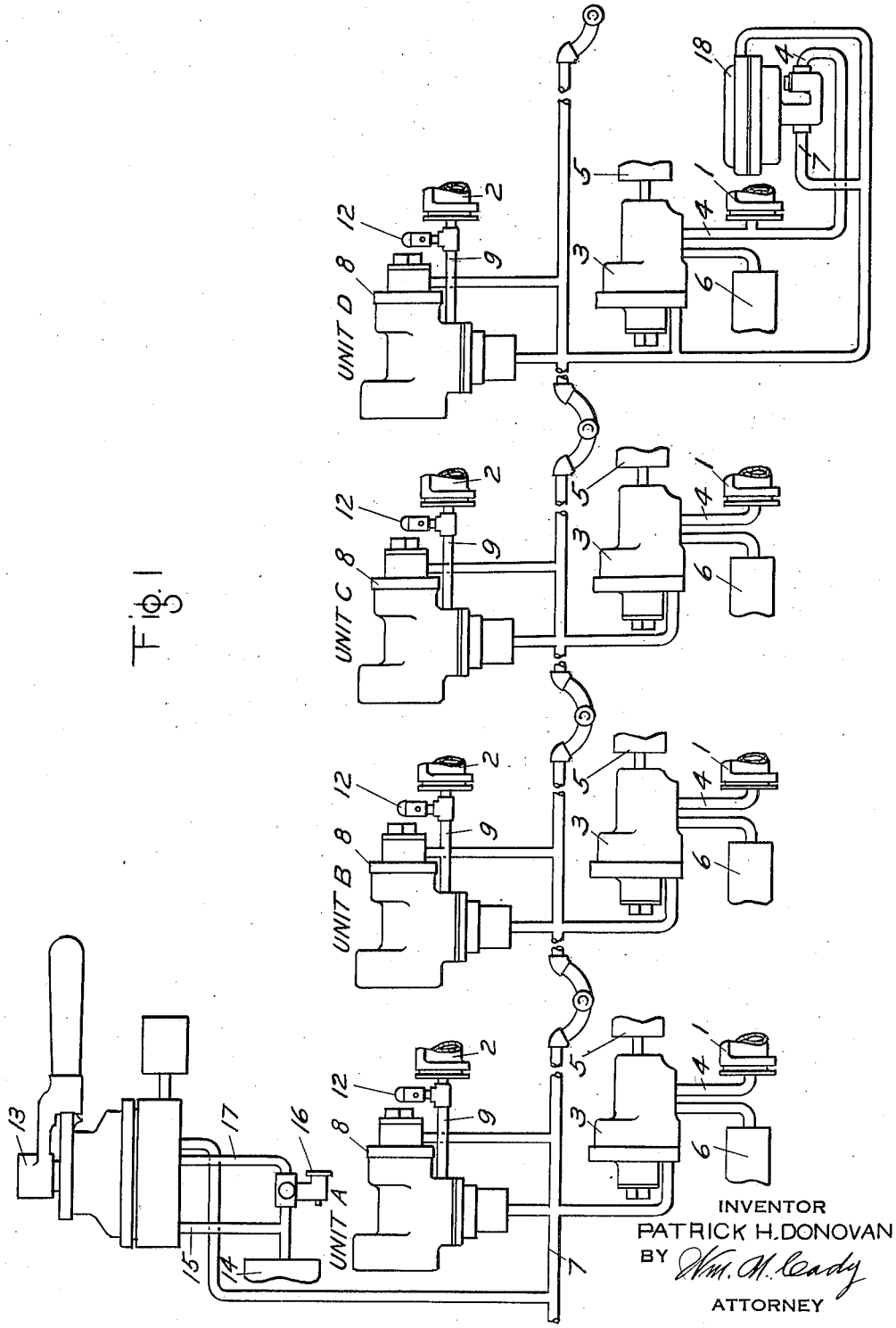
Figure 2:
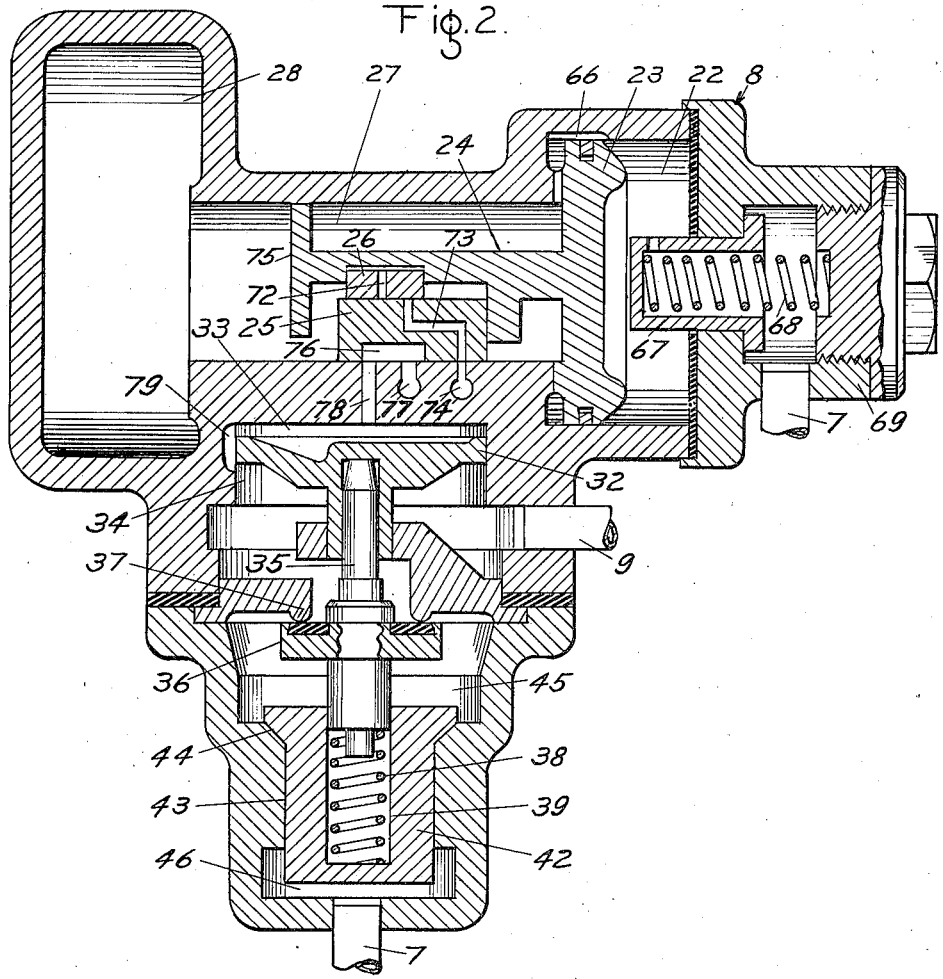
Figure 3:
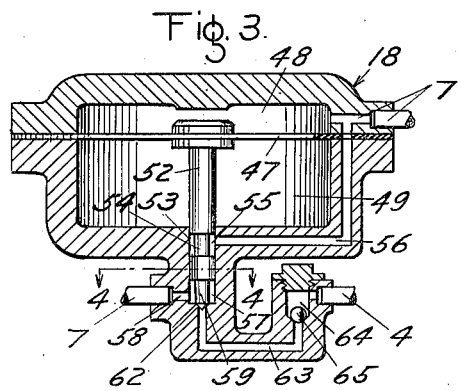
Figure 4:

Other objects and advantages of my invention will be apparent from the following description of one preferred embodiment thereof reference being had to the accompanying drawings in which, Fig. 1 is a diagrammatic view of apparatus employed in one preferred embodiment of the invention, Fig. 2 is a sectional view of the emergency valve device, Fig. 3 is a sectional view of the quick service valve device, and Fig. 4 is a sectional view taken on line 4—4 of Fig. 3.

Referring to the drawings and more particularly to Fig. 1 thereof the illustrated preferred embodiment of the invention contemplates the use of a service brake cylinder 1, and an emergency brake cylinder 2 with each braking unit on the train.

A brake controlling valve device, such as a triple valve device 3, is provided which is operative upon a reduction in brake pipe pressure to supply fluid under pressure from the usual auxiliary reservoir 5 to the brake cylinder 1 through pipe 4, and said triple valve device is of the type provided with means for effecting a local reduction in brake pipe pressure so as to produce quick serial action of the triple valve devices in effecting service applications of the brakes, such as the well known arrangement in which the triple valve devices operate upon a service rate of reduction in brake pipe pressure to vent fluid under pressure from the brake pipe to a vent chamber or bulb, such as the bulb 6.

An emergency valve device 8 is associated with each emergency brake cylinder 2 and is operative upon a reduction in brake pipe pressure at an emergency rate to vent fluid under pressure from the brake pipe 7 to the brake cylinder 2 through brake cylinder pipe 9. Interposed between the emergency valve device 8 and the emergency brake cylinder 2 and connected to the emergency brake cylinder pipe 9 is a blow-down or regulating valve device 12 which, when an emergency application of the brakes is being effected, functions to so regulate the emergency brake cylinder pressure as to insure the gentle gathering or closing of the slack in the train. This valve device 12 may be set to insure the build up of a predetermined emergency brake cylinder pressure and to blow this pressure down to atmospheric pressure during an emergency application of the brakes, the rate of blow-down being such as to insure the gentle gathering of the train slack.

In some cases, the valve device 12 may be set to limit the build up of emergency brake cylinder pressure to a value sufficient to start the slack in the train to run in but insufficient to cause the slack to run in harshly. On very long trains the emergency brake cylinder pressure may be limited to around nine pounds, whereas on shorter trains, such as is employed in passenger service, the limit may be higher.

The brake valve device 13 may be of the usual type for controlling the charging of the brake pipe 7 with fluid under pressure and the venting of fluid under pressure therefrom to effect an application of the brakes. A main reservoir 14 is provided which constitutes a source of fluid under pressure from which fluid under pressure may be supplied to the brake pipe 7 either directly through the main pipe 15, or as supplied at a reduced pressure through the feed valve device 16 and pipe 17.

A quick service valve device 18 that is responsive to a slight reduction in brake pipe pressure is provided on the rear car to effect a local reduction in brake pipe pressure on the car at the rear end of the train which will cause the triple valve device on the last car to operate and thus start quick service serial action from the rear of the train.

In Fig. 1 four braking units designated as units A, B, C and D are illustrated, it being understood that any number of like units corresponding to the number of braking units of the train may be employed.

Referring to Fig. 2 the emergency valve device 8 comprises a casing providing a piston chamber 22 containing a piston 23 that is in constant communication with the brake pipe 7 and is provided with a stem 24 that is operatively connected to a main slide valve 25 and a graduating valve 26 that is movable with respect to the main slide valve 25 within a valve chamber 27 that is connected to a quick action chamber 28 to provide the desired volume of fluid under pressure.

The casing also provides a quick action piston chamber 33 containing a quick action piston 32 separating the piston chamber 33 from a chamber 34 that is in constant communication with the emergency brake cylinder 2 through brake cylinder pipe 9. The piston 32 is provided with a stem 35 operatively connected to a quick action vent valve 36 that is normally forced to its rib seat 37 by a spring 38 the upper end of which engages the lower end of the stem 35, and the lower end of which terminates in the lower end of a bore 39 within a check valve 42, positioned in a bore 43 within the casing structure, and that is forced by the spring 38 into engagement with the check valve seat 44. The quick action valve 36 controls communication between the chamber 45 and the aforenamed chamber 34 and the check valve 42 is responsive to the differential pressure between a chamber 46, that is in constant communication with the brake pipe 7, and the chamber 45 to permit the flow of fluid under pressure from the chamber 46 to the chamber 45 and to prevent its flow in the opposite direction.

The valve device 18 (see Fig. 3) comprises a casing containing a diaphragm 47, dividing the casing into a chamber 48 that is in constant open communication with the brake pipe 7, and a chamber 49. A stem 52 extends from the diaphragm 47 of such diameter as to form a neat fit in a bore 53 in the casing to control communication between the chamber 49 and the brake pipe 7. A portion 54 of the stem 52 within the bore is made of reduced diameter to provide a chamber 55 that is in constant communication with the brake pipe 7 through passage 56. The lower end of the stem 52 is also decreased in diameter to provide a chamber 57 that is in constant communication with the brake pipe 7 through passage 58, the stem terminating in a valve 59 that is adapted to engage a valve seat 62 to close communication from the brake pipe 7 to the brake cylinder 1 through passage 63 and brake cylinder pipe 4. A check valve chamber 64 is provided in the passage 63 containing a ball check valve 65 for preventing the flow of fluid under pressure from the brake cylinder to the brake pipe.

The system is charged in the usual way by the flow of fluid under pressure from the main reservoir 14 through the brake valve device 13 to the brake pipe 7, and from the brake pipe 7 in the usual way to the triple valve device 3 to charge the auxiliary reservoir 5.

Fluid under pressure also flows from the brake pipe 7 to the piston chamber 22 of the emergency valve device 8 through the feed groove 66 past the piston 23 to charge the valve chamber 27 and the quick action chamber 28. The chamber 48 of the quick service valve device 18 is likewise charged from the brake pipe 7 as is also the chamber 49 by leakage of fluid under pressure past the stem 52. The bias of the diaphragm 47 is such that the valve 59 is maintained in engagement with the valve seat 62 so long as the pressure in the chamber 49 is equal to or less than the pressure in the chamber 48.

If the operator wishes to make a service application of the brakes, the handle of the brake valve device 13 is moved to a position to reduce the pressure in the brake pipe 7 at a service rate to effect the operation of the triple valve devices 3 to cause each triple valve to supply fluid under pressure from auxiliary reservoir 5 through the associated brake cylinder pipe 4 to the associated service brake cylinder 1.

Operation of the triple valves by the reduction in brake pipe pressure causes each triple valve device to effect a local reduction in brake pipe pressure which is serially propagated throughout the train from the front to the rear so as to produce quick serial service action. While this action accelerates the propagation of the braking action throughout the train the rate of propagation depends upon the successive movement of the triple valve devices to service position. This movement, however, is not effected until the brake pipe pressure has been reduced, say three or four pounds.

It is evident, however, that the brake pipe pressure commences to reduce upon the rear car sometime before the reduction is sufficient to cause the operation of the triple valve device on the rear car and, according to my invention, and in order to hasten the quick serial action, advantage is taken of this fact by providing a valve device on the rear car which is responsive to a light reduction in brake pipe pressure, say one-half pound, and that operates to locally vent fluid under pressure from the brake pipe on the rear car, so as to cause the triple valve device on the rear car to operate and thus start the propagation of a quick service serial action from the rear car forwardly. Thus, braking action takes place on the rear car some time before the triple valve device on the rear car would have operated if the operation had depended upon a serial reduction in brake pipe pressure of three or four pounds as a result of the usual quick service serial action.

When a light reduction in brake pipe pressure is effected on the valve device 18, say one-half pound, this reduction in pressure in chamber 48 is sufficient to cause the fluid pressure in chamber 49 to move the diaphragm 47 upwardly so as to unseat the valve 59 and permit the flow of fluid under pressure from the brake pipe 7 through chamber 57, passage 63, past the valve 65, through the brake cylinder pipe 4 to the service brake cylinder 1 on the last car of the train. The size of the passages are such that the brake pipe pressure is reduced at a service rate at the rear end of the train.

The local reduction in brake pipe pressure caused by operation of the quick service valve device 18 causes the triple valve device 3 on the rear car of the train to operate and start the serial quick service action from the rear of the train several seconds in advance of the time in which the serial quick service action is propagated from the head end of the train would have produced a sufficient reduction in brake pipe pressure to cause the triple valve device on the rear car to be operated.

Upon a reduction in brake pipe pressure at a service rate the piston 23 of the emergency valve device 8 is moved toward the left sufficiently to engage the end of the graduating stem 67 that is held in its illustrated position by the graduating spring 68, one end of which engages a cavity in the graduating stem 67 and the other end of which engages a cavity in a cap nut 69 that is screw-threadedly attached within a bore in the casing of the emergency valve device. As the piston 23 is moved into engagement with the graduating stem 68 the graduating valve 26 is moved to bring the port 72 therein into registration with the port 73 through the main slide valve 25 to effect communication between the slide valve chamber 27 and the quick action chamber 28 to the atmosphere through ports 72 and 73 and exhaust port 74. The size of the port 72 is so designed as to effect a reduction in pressure in the quick action chamber 28 and the slide valve chamber 27 corresponding to a service rate of reduction in brake pipe pressure, and to thus prevent a sufficient differential in pressure from building up on the opposite sides of the piston 23 to effect movement of the graduating stem 67 against the pressure of the spring 68. It will therefore be appreciated that, upon a service rate of reduction in brake pipe pressure, the emergency valve device 8 will not effect the supply of fluid under pressure to the emergency brake cylinder 2 of the several braking units.

When it is desired to effect an emergency application of the brakes, the brake pipe pressure is reduced at an emergency rate and the emergency piston is moved out to emergency position, since the size of the port 72 is insufficient to effect a reduction in pressure in the quick action chamber 28 and the main slide valve chamber 27 at the left of the piston 23 as rapidly as the pressure is reduced in the piston chamber 22, thus building up a differential that is sufficient to cause the piston 23 to move against the graduating stem 67 and compress the spring 68, thus moving the main slide valve 25 toward the right to close communication from the quick action piston chamber 33 to the atmosphere through port 78, cavity 76 in the main slide valve, and exhaust port 77, and to effect communication from the slide valve chamber 27 past the left end of the slide valve 25, through port 78 to the quick action piston chamber 33, to force the piston 32 and the quick acting valve 36 downwardly against the force of the spring 38 to effect communication from the chamber 45 to the emergency brake cylinder 1 through brake cylinder pipe 9. This effects a rapid reduction in pressure in the chamber 45, the greater pressure in the chamber 46 causing the check valve 42 to be moved upwardly from its seat 44 against the force of spring 38 to effect communication from brake pipe 7 to the emergency brake cylinder 2 through chambers 45, 34, and brake cylinder pipe 9. This action of the quick action valve 36 effects a rapid rate of reduction in brake pipe pressure and causes pressure to be rapidly built up in the emergency brake cylinder 2.

Now when the pressure of fluid in the emergency brake cylinder has been increased to the setting of the valve device 12, said valve device operates to vent fluid under pressure being supplied to this brake cylinder. When the valve device 12 is set to blow down emergency brake cylinder pressure to atmospheric pressure, the spring 38 acts to seat the check valve 42 when the brake pipe pressure is reduced to atmospheric pressure. In the event that the valve device is set to limit the emergency brake cylinder pressure, the spring 38 acts to seat the check valve 42 when the brake pipe pressure has been reduced to the limited emergency brake cylinder pressure, thus preventing loss of emergency brake cylinder pressure as the brake pipe pressure continues to reduce by way of the brake valve device.

When an emergency rate of reduction in brake pipe pressure is effected, the triple valves 3 are also operated in the usual manner to supply fluid under pressure to the brake cylinder 1.

From the foregoing description it will be understood that when the emergency valve device moves to emergency position, there will be a rapid inshot of fluid under pressure to the emergency brake cylinder, the brake cylinder pressure resulting from such inshot being so regulated by the operation of the valve device 12 as to start the slack in the train to run in without causing harsh slack closing or run in shocks.

Since the triple valve device is supplying fluid under pressure from the auxiliary reservoir to the service brake cylinder 1 at the same time as the emergency valve device is supplying fluid under pressure from the brake pipe to the emergency brake cylinder and the valve device 12 is functioning to blow down or limit emergency brake cylinder pressure, the service brake cylinder functions to complete the emergency application at a service rate following the operation of the valve device 12 to prevent any further build up of emergency brake cylinder pressure. By reason of this controlled build up of brake cylinder pressure harsh run in or closing of the slack in the train during an emergency application of the brakes is prevented.

Upon an increase in brake pipe pressure to release the brakes, the piston 23 is moved to the left to its illustrated position, thus releasing fluid under pressure from the chamber 33 to the atmosphere through passage 78, cavity 76 and the exhaust port 77. The spring 38 forces the quick action valve 36 to its seat and the piston 32 to its illustrated position, thus establishing communication from the emergency brake cylinder 2 to the atmosphere through brake cylinder pipe 9, chamber 34, release screw 79, past the piston 32 and through passage 78, cavity 76, and exhaust port 77.

Many modifications may be made in the apparatus disclosed without departing from the spirit of my invention and I do not wish to be limited otherwise than by the scope of the appended claims.

Having now described my invention, what I claim as new and desire to secure by Letters Patent, is:

1. In a fluid pressure brake system, in combination, a brake pipe, a brake unit comprising a service brake cylinder and means operable upon a reduction in brake pipe pressure for supplying fluid under pressure to said service brake cylinder, an emergency brake cylinder, an emergency valve device subject to brake pipe pressure and effective upon a reduction in brake pipe pressure at an emergency rate for supplying fluid under pressure from said brake pipe to said emergency brake cylinder, and means automatically operative to vent fluid under pressure being supplied to the emergency brake cylinder when the emergency brake cylinder pressure is increased to a predetermined value.

2. In a fluid pressure brake system, in combination, a brake pipe, a brake unit comprising a service brake cylinder and means operable upon a reduction in brake pipe pressure for supplying fluid under pressure to said brake cylinder, an emergency brake cylinder and an emergency valve device comprising a casing containing a quick action chamber normally charged to brake pipe pressure and a movable abutment subject on one side to brake pipe pressure and on the other side to the pressure in said quick action chamber, valve means operable by said movable abutment upon a reduction in brake pipe pressure at a service rate for venting said quick action chamber to effect a rate of reduction in pressure therein corresponding substantially to the rate of reduction in pressure in said brake pipe, valve means operable by said movable abutment upon a reduction in brake pipe pressure at an emergency rate for effecting the supply of fluid under pressure from said brake pipe to said emergency brake cylinder, and means subject to the pressure of fluid being supplied to the emergency brake cylinder for preventing fluid under pressure thus supplied from increasing emergency brake cylinder pressure above a predetermined value.

3. In a fluid pressure brake system, in combination, a brake pipe, a brake unit comprising a service brake cylinder and means operable upon a reduction in brake pipe pressure for supplying fluid under pressure to said brake cylinder, an emergency brake cylinder and an emergency valve device subject to brake pipe pressure and effective upon a reduction in brake pipe pressure at an emergency rate for supplying fluid under pressure from said brake pipe to said emergency brake cylinder, and means for gradually reducing emergency brake cylinder pressure to a predetermined value.

4. In a fluid pressure brake system, in combination, a brake pipe, a brake unit comprising a service brake cylinder and means operable upon a reduction in brake pipe pressure for supplying fluid under pressure to said brake cylinder, an emergency brake cylinder and an emergency valve device comprising a casing containing a quick action chamber normally charged to brake pipe pressure and a movable abutment subject on one side to brake pipe pressure and subject on the other side to the pressure in the quick action chamber, valve means operable by said movable abutment upon the reduction in brake pipe pressure at a service rate for venting said quick action chamber to effect a rate of reduction in said quick action chamber corresponding substantially to the rate of reduction in brake pipe pressure, and valve means operable by said movable abutment upon a reduction in brake pipe pressure at an emergency rate for effecting the supply of fluid under pressure from said brake pipe to said emergency brake cylinder, and a valve device for gradually releasing fluid under pressure from said emergency brake cylinder.

5. In a fluid pressure brake, in combination, a brake pipe, a brake cylinder, a brake controlling valve device operated upon either a gradual or a sudden reduction in brake pipe pressure for supplying fluid under pressure to the brake cylinder, a second brake cylinder, a valve device operated upon a sudden reduction in brake pipe pressure for venting fluid from the brake pipe to the second brake cylinder, and means for limiting the maximum pressure obtainable in the second mentioned brake cylinder to a value less than that of the maximum pressure obtainable in the first mentioned brake cylinder.

6. In a fluid pressure brake, in combination, a brake pipe, a brake cylinder, a brake controlling valve device operated upon a reduction in brake pipe pressure for supplying fluid under pressure to the brake cylinder, a second brake cylinder, a vent valve device operated to vent fluid under pressure from the brake pipe to said second brake cylinder, means operative upon a predetermined increase in the pressure of fluid vented from the brake pipe for limiting the pressure in the second brake cylinder and valve means operated upon a sudden reduction in brake pipe pressure for effecting the operation of said vent valve device.

7. In a fluid pressure brake, in combination, a brake pipe, a service brake cylinder, an emergency brake cylinder, a valve device operative upon a reduction in brake pipe pressure to supply fluid under pressure to the service brake cylinder, an emergency valve device operative only upon a sudden reduction in brake pipe pressure for supplying fluid under pressure to the emergency brake cylinder, and means responsive to a predetermined emergency brake cylinder pressure to prevent emergency brake cylinder pressure from exceeding said predetermined pressure.

8. In a fluid pressure brake, in combination, a brake pipe, an emergency brake cylinder, an emergency valve device operative upon a sudden reduction in brake pipe pressure for supplying fluid under pressure to the emergency brake cylinder to initiate an emergency application of the brakes, means operative to prevent the emergency brake cylinder from being increased above a predetermined value, a service brake cylinder, and means operative upon the sudden reduction in brake pipe pressure for supplying fluid under pressure to the service brake cylinder to complete the emergency application of the brakes.

9. In a fluid pressure brake, in combination, a brake pipe, a service brake cylinder, an emergency brake cylinder, valve mechanism operative upon a sudden reduction in brake pipe pressure to supply fluid under pressure to the emergency brake cylinder at a fast rate and to the service brake cylinder at a slower rate to effect an emergency application of the brakes, and means responsive to the pressure of fluid supplied to the emergency brake cylinder for limiting the maximum pressure obtainable in the emergency brake cylinder to a value less than that of the maximum pressure obtainable in the service brake cylinder.

10. In a fluid pressure brake, in combination, a brake pipe, a service brake cylinder, an emergency brake cylinder, valve mechanism operative upon a sudden reduction in brake pipe pressure to supply fluid under pressure to the emergency brake cylinder at a fast rate and to the service brake cylinder at a slower rate to effect an emergency application of the brakes, and means operative by fluid under pressure supplied to the emergency brake cylinder to prevent the emergency brake cylinder pressure from being increased to equal the maximum pressure obtainable in the service brake cylinder.

11. In a fluid pressure brake, in combination, a brake pipe, a service brake cylinder, an emergency brake cylinder, valve mechanism operative upon a sudden reduction in brake pipe pressure to supply fluid under pressure to the emergency brake cylinder at a fast rate and to at the same time supply fluid under pressure to the service brake cylinder at a slower rate, and valve means operative to limit the increase in emergency brake cylinder pressure.

PATRICK H. DONOVAN.